United States Patent Office 3,469,365
Patented Sept. 30, 1969

3,469,365
COIN HANDLING APPARATUS AND MEANS TO DETECT IRREGULARITIES IN THE OPERATION THEREOF
Isamu Uchida and Shigeru Miyayama, Tokyo, Kenkichi Watanabe, Kanagawa-ken, Eiichi Kokubo, Saitama-ken, and Kyoichi Osako, Tokyo, Japan, assignors to Tenshin Manicounting Machine Co. (Tenshin Kahei Keisanki K.K.), Tokyo, Japan
Filed Oct. 25, 1967, Ser. No. 678,082
Claims priority, application Japan, Oct. 27, 1966, 41/70,962
Int. Cl. B65b 57/10, 57/18
U.S. Cl. 53—54
15 Claims

ABSTRACT OF THE DISCLOSURE

A coin handling machine with a centrifugal coin supply feeding a coin selector which passes selected coins through a counting means to a coin stacking device wherein the stacks of coins are measured and if of proper size are transported to a wrapping device whereat the stacks are wrapped. Two sources of power are provided one of which drives the coin supply, the other source of power driving the wrapping and transport means. A monitoring device is provided responding to irregularities in the operation of the machine to perform certain control functions. According to one aspect of the monitoring device, it responds to the monitoring device to detect a short stack of coins after a predetermined number of coins has been counted. According to another aspect, a supply of wrapping material used in the wrapping operation is used to control a switch in order to detect when the supply of wrapping material is not being properly effected. In addition, at least one of the sources of power includes a shaft on which are mounted cams which control electrical switches in turn controlling the electrical circuit of the device, this electrical circuit including interdependent relays which control the operation of the machine.

Drawing

Detailed description

The present invention relates to coin counting and wrapping machines and more particularly to systems which detect irregularities in the operation of a machine of the type described.

It is an object of the present invention to provide a system for automatic machines adapted to select, count, stack and wrap coins, which system is capable of detecting irregularities in machine operation in a positive manner for preventing repetition of a faulty operation.

Other objects and advantages of the present invention will become apparent from the following detailed description taken in conjunction with the accompanying drawings.

Outline of the machine

Figure 1:
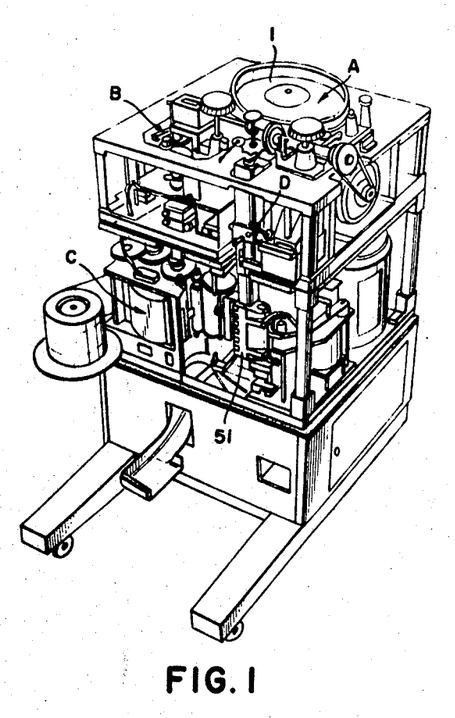
FIGURE 1 is a perspective view of the entire structure of a coin counting and wrapping machine in which the present invention is embodied.

Referring to FIG. 1, the coin counting and wrapping machine comprises a coin selecting section A, a coin counting section B and a coin wrapping section C, said section B being arranged adjacent the exit portion of said section A and said section C being arranged below said section B and in communication therewith through a substantially vertical coin passage D.

Coin selecting and feeding section

Figure 2:
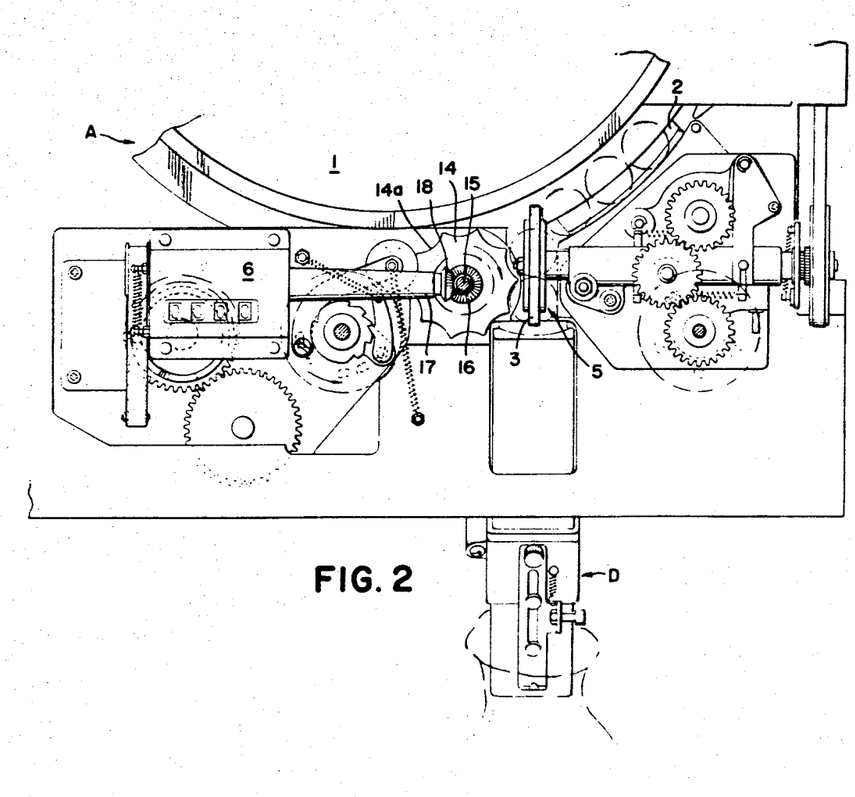
FIGURE 2 is a fragmentary plan view showing the arrangement of a coin selecting mechanism, coin feed mechanism and coin counting mechanism.

Referring to FIG. 2, it will be seen that the coin selecting section A includes a rotary disc 1 to be driven by suitable drive means. Coins placed on the rotary disc 1 are bodily rotated about the center of the disc as said disc 1 rotates and are moved into a coin selecting groove 2 under the centrifugal force developed therein. In the coin selecting groove 2, coins of a desired type only are selected and sent into the coin passage D one after another by a coin discharge wheel 3 at the coin discharge portion 5. This coin selecting and feeding mechanism may be of any known type.

Coin counting section

A star wheel 14 (FIG. 2) having a plurality of arcuate notches 14a formed in the periphery thereof is mounted on a vertical rotary shaft 15 on one side of the coin discharge passage at the coin discharge portion 5. The top end of the shaft 15 extending upwardly above the wheel 14 is provided with a bevel gear 16 which is in engagement with a bevel gear 18 mounted on one end of a horizontal shaft 17. The coins passing through the coin discharge passage at the coin discharge portion 5 each fit in each notch 14a in the star wheel 14, causing said star wheel 14 to rotate, and the rotation of the star wheel is transmitted to the shaft 17 through the bevel gears 16 and 18. The shaft 17 has the other end connected to a counter 6 of known construction. Thus, it will be appreciated that the number of coins having passed through the coin discharge passage is recorded in the counter 6 as the rotation of the star wheel 14 caused by said coins is transmitted to said counter.

Coin stacking section

Figure 3:
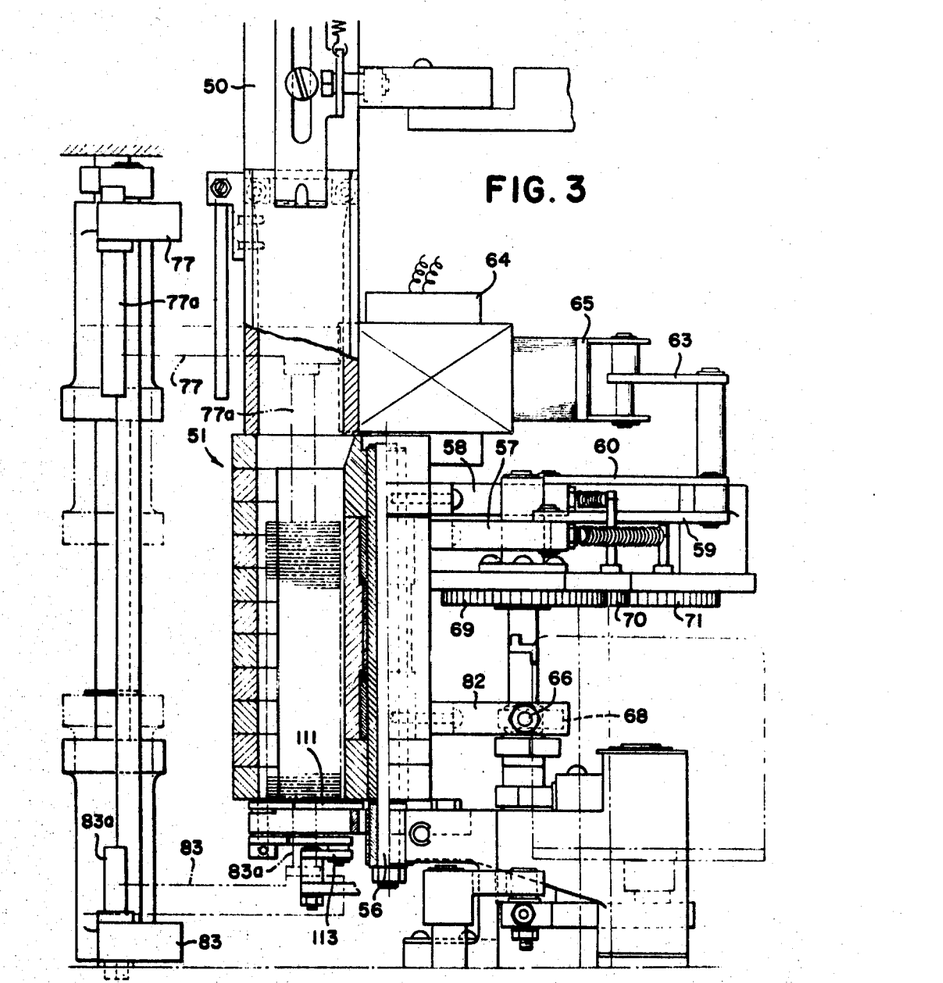
FIGURE 3 is a fragmentary side elevation, partly in section, of a coin stacking section.

The coin stacking section comprises a substantially vertical coin passage 50 (FIG. 3) placed sequentially to the coin discharge passage at the coin discharge portion 5 and a coin stacking cylinder assembly 51 provided below said coin passage 50. The coin stacking cylinder assembly 51 is composed of a pair of cylinder halves 54 and 55 (FIG. 5) each of which defines a longitudinal semi-cylindrical concavity 52 or 53 which are arranged confronting each other, halves 54 and 55 being hinged together by means of a hinge pin 56 extending substantially vertically. The cylinder assembly 51 is openable from a closed position indicated by the solid lines to an open position indicated by the chain lines in FIG. 5. In the closed position, the semi-cylindrical concavities 52 and 53 together form a substantially cylindrical cavity for stacking coins therein.

Figure 5:
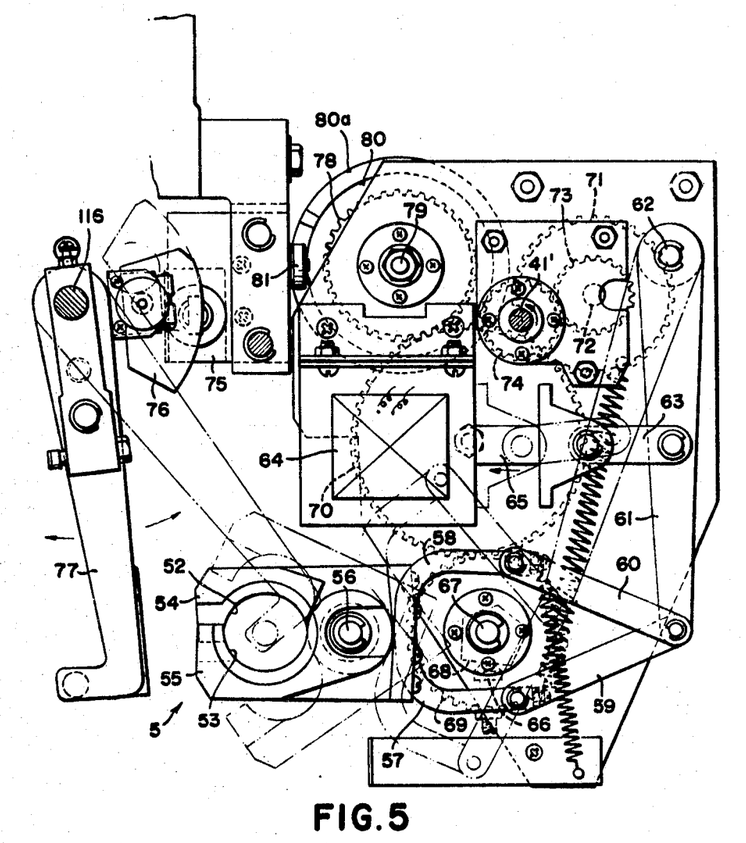
FIGURE 5 is a plan view of the coin stacking section shown in FIG. 4.

The cylinder halves 54 and 55 respectively have operating arms 57 and 58 fixed to one side thereof, and the free ends of the arms 57 and 58 are articulated to one end of a rocking lever 61 through connecting levers 59 and 60 respectively. The other end of the lever 61 is pivoted to the machine frame by a pin 62. The lever 61 is connected at its intermediate portion to an actuating rod 65 of a solenoid assembly 64 by way of a link lever 63.

Figure 4:
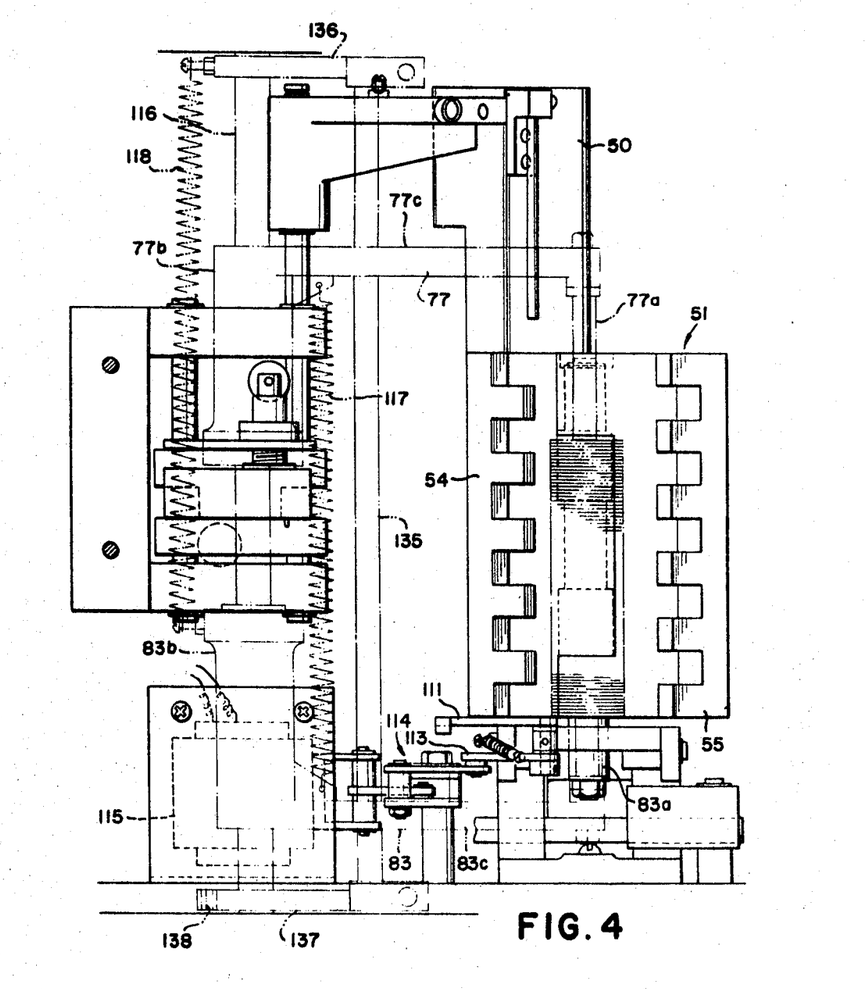
FIGURE 4 is a front elevation of the coin stacking section.

When the solenoid 64 is not excited, with the rod 65 located in the protruding position indicated by the solid lines in FIG. 5, the cylinder assembly 51 is held in the closed position as indicated by the solid lines, whereas, when the solenoid 64 is excited and the rod 65 is retracted to a position indicated by the chain line in FIG. 5, the cylinder assembly 51 is opened as indicated by the chain lines in FIG. 5 and by the solid lines in FIG. 4, enabling the coins stacked in the interior of the assembly to be removed therefrom.

An arm 82 (FIG. 3) provided below the arm 57 carries a stopper 66 as shown in FIG. 5. This stopper 66 is adapted to abut against a cam 68, securely mounted on a vertical shaft 67, when the cylinder assembly 51 is brought to the closed position. By suitably positioning the cam 68 upon rotating the shaft 67 in accordance with the diameter of the coin to be selected, it is possible to adjust the diameter of the stacking cavity in the cylinder assembly 51 to a desired value corresponding to the diameter of said coin.

The shaft 67 carries a gear 69 which is in engagement with a gear 71 through the intermediary of an intermediate gear 70. The gear 71 is mounted on a shaft 72 which also has a gear 73 mounted thereon. The gear 73 meshes with a gear 74 mounted on a shaft 41' which is connected to a shaft 41. Thus, it will be seen that the position of the cam 68 may be adjusted by rotating the shaft 41 through the gear train 74, 73, 71, 70 and 69. Since the arrangement described above enables the diameter of the stacking cavity in the cylinder assembly 51 to be adjusted to a value optimum for the diameter of the coin to be selected, possibility of misalignment of the coins stacked in the cavity can be drastically reduced.

Figure 6:
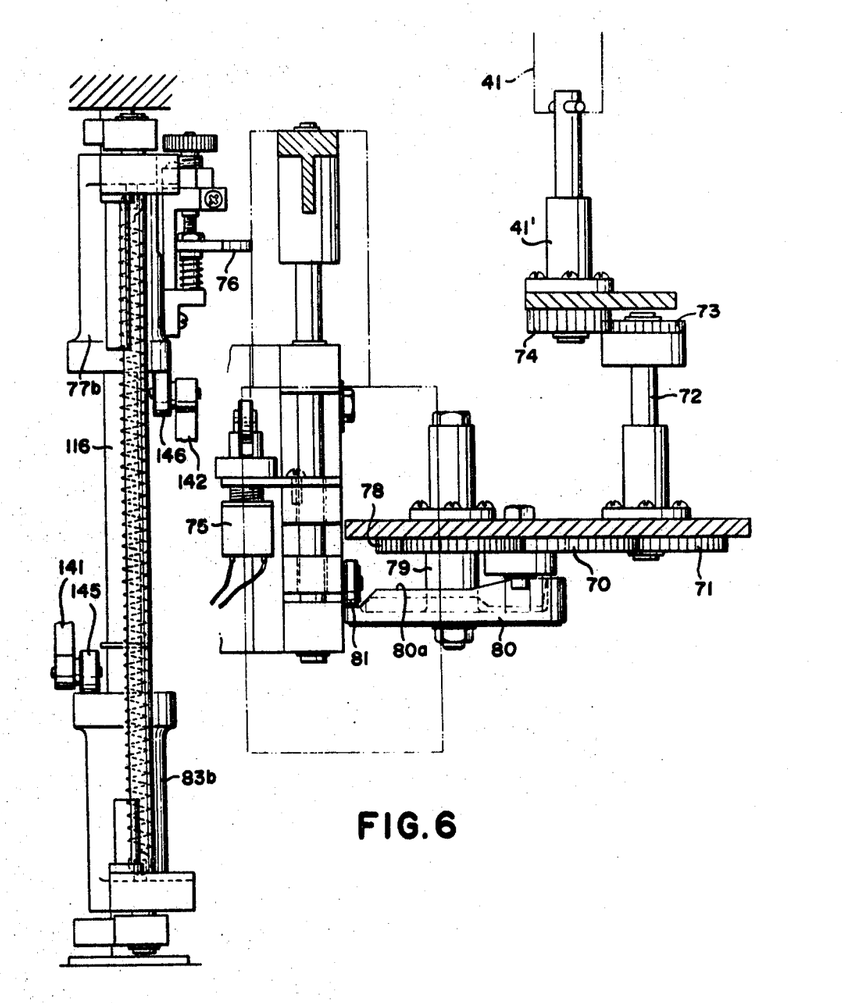
FIGURE 6 is a side elevation of switch means provided for detecting an incomplete coin stack.

The coin stacking section includes a system adapted to detect coins stacked in the stacking cylinder assembly in a predetermined number. This system comprises a switch 75 adapted to be actuated by an actuating member 76 connected to an upper lever 77 for gripping the coin stack in the coin wrapping section to be described later. The switch is closed when the lever 77 is lowered to a position below a predetermined level for coin stack gripping operation. Since the aforementioned coin discharge mechanism is so arranged as to cease its operation from a time when a predetermined number of coins have been feed into the cylinder assembly 51 to a time when the coin stack has been removed from said cylinder assembly, the number of coins in the cylinder assembly 51 will not exceed the predetermined number.

The height of coin stack varies depending upon the type of coin to be selected and wrapped. The position of the switch 75 must, therefore, be adjusted in accordance with the type of coin to be selected. For this purpose, a gear 78 is provided on a shaft 79 to mesh with the gear 70 and on said shaft 79 is mounted a disc-like cam 80 having a cam surface 80a along its periphery on which a cam driven roller 81 of the switch 75 rolls. The switch 75 is movable in a vertical direction so that, when the cam driven roller 81 is moved up and down by the cam surface 80a as it rolls on said surface, the position of the switch 75 is shifted vertically. Upon rotation of the shaft 41, the cam 80 is rotated through the gears 70 and 78.

Below the stacking cylinder assembly 51 is provided a bottom plate 111 (FIG. 4) which is retractably pivoted to a fixed arm 112. Thus, upon actuation of a solenoid 115, the bottom plate 111 is retracted laterally from a position immediately below the stacking cavity by way of a lever 113 and a linkage 114, which are movable integrally with said bottom plate 111.

Coin wrapping section

This section comprises a pair of vertically arranged gripping levers 77 and 83 (FIGS. 4 and 5) which are not only swingable but also movable vertically. These levers carry at their free ends gripping pins 77a and 83a respectively and are swingable about a guide post 116 clockwise from a gripping position indicated by the chain lines in FIG. 5 to a wrapping position or vice versa. Furthermore, the levers 77 and 83 are movable vertically from a position indicated by the solid lines to a position indicated by the chain lines in FIG. 3 or vice versa.

The levers 77 and 83 respectively have brackets 77b and 83b slidably rotatably mounted on the vertical guide post 116 and integral arms 77c and 83c, and the aforementioned gripping pins 77a and 83a are fixed to the end extremities of the arms 77c and 83c respectively. The lever 77 is urged downwardly by a spring 117, whereas the lever 83 is urged upwardly by a spring 118.

Figure 7:
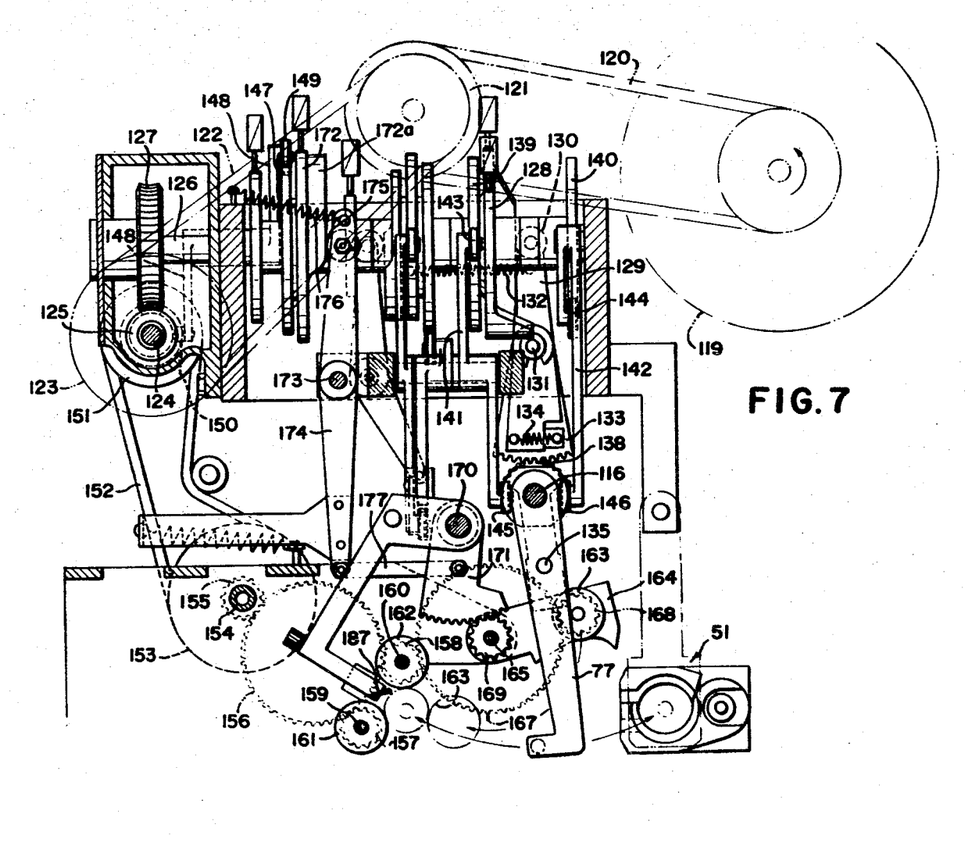
FIGURE 7 is a plan view of a coin wrapping mechanism.

A mechanism to operate the levers 77 and 83 is shown in FIG. 7. As may be seen in this latter figure, the mechanism includes a motor 119 which drives a pulley 123 by way of a belt 120, a pulley 121 and another belt 122. The pulley 123 is rotatably mounted on the top end of a shaft 124 and may be operatively connected to said shaft 124 as desired by a clutch (not shown) which is operated by a solenoid hereinafter described. The shaft 124 has an integral worm gear 125 thereon which is in engagement with a gear fixed on a horizontal shaft 126. The shaft 126 has a cam 128 fixedly mounted thereon whose cam surface is in engagement with a cam driven roller 130. The cam driven roller 130 is mounted on one end of a lever 129 which is mounted on a pivot pin 131 such that it is rockable in a horizontal plane. The lever 129 is urged to rotate counterclockwise under the bias of a spring 132, so that the roller 130 may be pressed against the cam surface of the cam 128. A sector gear 133 is pivotally mounted on the pin 131, and the lever 129 and the sector gear 133 are elastically connected with each other by means of a spring 134.

Referring to FIG. 4, a pin 135 extends through the arms 77c and 83c of the respective levers 77 and 83, and both of the upper and lower ends thereof are connected to arms 136 and 137 respectively which are rotatably mounted on the guide post 116. The arm 137 is formed with teeth 138 in concentric relation to the guide post 116 for engagement with the sector gear 133 (FIG. 7). With the arrangement described, when a predetermined number of coins have been fed into the stacking cylinder assembly, this is detected by the counter and an electric signal is emitted to excite the aforementioned magnetic clutch, whereby the pulley 123 is operatively connected with the shaft 124 and thus the rotation of the motor is transmitted to the horizontal shaft 126. The cam 128, therefore, starts to rotate causing the levers 77 and 83 to swing about the guide post 116.

Also fixedly mounted on the shaft 126 are cams 139 and 140 whose peripheral cam surfaces are in engagement with cam driven rollers 143 and 144 respectively which are carried by respective levers 141 and 142 arranged for swinging movement about a horizontal axis. The levers 141 and 142 carry at the other ends thereof rollers 145 and 146 respectively. Those rollers 145 and 146 are brought in engagement with the brackets 83b and 77b of the levers 83 and 77 respectively by virtue of the configurations of the cams 139 and 140, so as to move the lever 83 downwardly and the lever 77 upwardly. The configurations of the cams 139 and 140 are so selected that the rollers 145 and 146 are moved upwardly and downwardly respectively when the levers 77 and 83 are swung counterclockwise under the action of the cam 128 and brought to the upper and lower ends of the coin stack in the coin stacking cylinder assembly 51. In these positions, the levers 77 and 83 are moved towards each other under the bias of the respective springs 117 and 118 and grip the coin stack with their pins 77a and 83a. Thereafter, the levers 77 and 83 are swung clockwise about the guide post 116 by the action of the cam 129.

Another cam 147 is fixedly mounted on the shaft 126 and its peripheral cam surface is in engagement with a cam driven roller 149 which is mounted on the free end of one of the arms of an arm lever 148 rotatably mounted on the horizontal shaft. The free end 150 of the other arm of said arm lever 148 is in engagement with a clutch (not shown) which is provided at the lower end of the shaft 124 for operatively connecting said shaft with a pulley 151. When the roller 149 is depressed by the cam 147, therefore, the free end 150 of the lever 148 is moved upwardly to bring the clutch in an engaged position and thus the shaft 124 is operatively connected with the pulley 151. Under this state, the driving power from the motor 119 is transmitted to the pulley 153 through the pulley 151 and a belt 152.

A shaft 154, on which the pulley 153 is fixedly mounted, has a gear 155 fixed thereon, and the gear 155 meshes with a gear 156 which in turn meshes with a pair of suitably spaced gears 157 and 158 mounted on shafts 159 and 160 respectively. As shown in FIG. 7, wrapping rollers 161 and 162 are mounted on the shafts 159 and 160 respectively. The gripping levers 77 and 83 are arranged such that, when they are swung clockwise as viewed in FIG. 7, the coin stack gripped thereby is carried to a position indicated by the chainline in FIG. 7 to contact the rollers 161 and 162.

A third roller or a pressing roller 163 is rotatably mounted on each of a pair of upper and lower arms 164 (only one being shown in FIG. 7) which are rotatably mounted on a pin 165. The pin 165 has a gear 167 mounted thereon for engagement with the gear 158, whereas the roller 163 is provided with a gear 168 for engagement with the gear 167. A gear 169 mounted on the pin 165 rotates along with the arms 164 and engages a sector gear 171 which is swingably mounted on the pin 170.

Also fixedly mounted on the shaft 126 is a cam 172 whose cam surface 172a is in engagement with a cam driven roller 175 mounted on one end of a lever 174 which is swingable about a vertical pin 173. A spring 176 is provided to keep the roller 175 in pressure contact with the cam surface 172a. The other end of the lever 174 is articulated to the sector gear 171 by way of a link 177. Due to the arrangement described, when the lever 174 is swung under the action of the cam 172, the gear 169 is rotated by way of the sector gear 171, and thus the gear 168 and therefore the roller 163 move along the periphery of the gear 167. The configuration of the cam surface 172a of the cam 172 is selected such that the roller 163 moves clockwise about the pin 165 along the periphery of the gear 167 to a position indicated by the chain line in FIG. 7, after the gripping levers 77 and 83 rotate clockwise about the post 116 while holding the coin stack and bringing said coin stack to the position in which said coin stack is brought into contact with the rollers 161 and 162.

A wrapping web feed mechanism comprises a driving feed roller 178 (FIG. 9) and a pressure roller 179 in pressure contact therewith under the bias of a spring 180. A wrapping web W passes through the nip between the rollers 178 and 179 and is fed towards the wrapping rollers 161 and 162 by the roller 178. During travelling, the web W is guided towards the roller 161 by a substantially arcuate guide plate 186 provided between the feed roller 178 and the wrapping roller 161. On that side of the passage of the web which is closer to the feed roller 178 is provided a cutting knife 181 adjacent the guide plate 186. The feed roller 178 has a gear 182 (FIG. 8) fixed thereto which is driven by the gear 156 through the gears 183, 184 and 185.

With the wrapping mechanism constructed as described above, when the shaft 126 (FIG. 7) is rotated by the motor 119 acting through the shaft 124, the levers 77 and 83 are first moved to the coin stack gripping position under the action of the cam 128 and then moved vertically towards each other by the actions of the cams 139 and 140 to grip the coin stack with their gripping pins 77a and 83a. The coin stack thus gripped is then brought to the position indicated by the chain line in FIG. 7 to contact the wrapping rollers 161 and 162. Then, the roller 163 is moved to the position indicated by the chain line in FIG. 7 along the periphery of the gear 167 under the action of the cam surface 172a of the cam 172, and thus the coin stack is held by the rollers 161, 162 and 163. At the same time, the clutch is placed in an operative position under the action of the cam 147, operatively connecting the shaft 124 with the pulley 151. The driving power, therefore, is transmitted to the roller 178 and wrapping rollers 161, 162 and 163 through the belt 152, pulley 153 and the gear train. The wrapping web W is fed to the roller 178 and wound tightly about the coin stack by the action of the rollers 161, 162 and 163.

Figure 8:
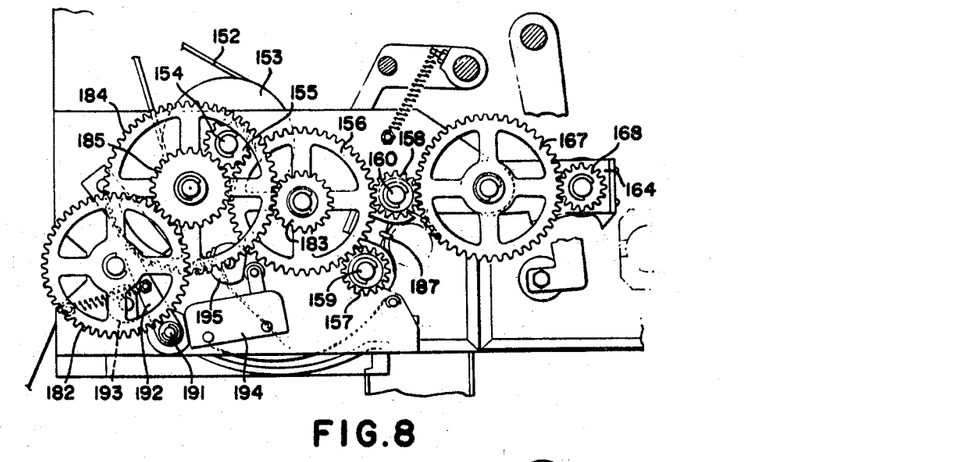
FIGURE 8 is a plan view of a drive gear train.
Figure 9:
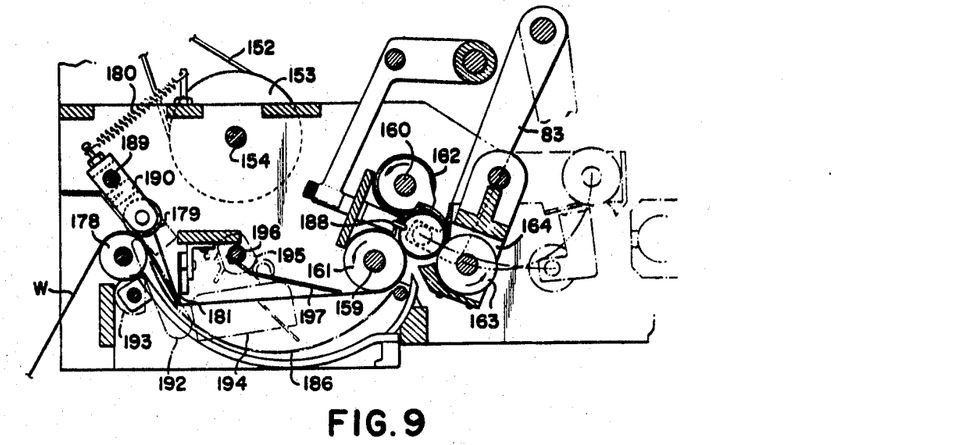
FIGURE 9 is a horizontal cross sectional view through a plane below the drive gear train shown in FIG. 8.

A beading mechanism of known type having a pair of vertically spaced hooks, i.e., an upper hook 187 shown in FIGS. 7 and 8 and a lower hook 188 shown in FIG. 9, is arranged intermediate the rollers 161 and 162. These hooks 187 and 188 serve to form beads in the web at both the upper and lower ends of the wrapping web which is wrapped in cylindrical shape about the coin stack, these beads preventing said wrapping web from being unwrapped.

The pressure roller 179 cooperating with the feed roller 178 is supported on an arm 190 which is pivotally mounted on a pin 189, and the arm 190 has its side wall in abutment against one end of a lever 192 which has the other end pivotally mounted on a pin 191. The lever 192 is in engagement with a cam 193. When a predetermined length of the web W is fed, the cam 193 is rotated by suitable means (not shown) to cause the lever 192 to turn clockwise, which in turn causes the arm 190 to move, whereby the roller 179 is removed from the roller 178 and thus the feeding of the web is stopped. In this case, however, since the wrapping rollers 161 and 162 continue to rotate, the web is pulled out in stretched condition as shown in FIG. 9. Further pulling of the web causes it to be cut by the knife 181.

In the apparatus of the present invention, there is provided a mechanism to detect the web's having been fed to and wrapped about the coin stack in an orderly manner. This mechanism includes a microswitch 194, a cam 195 to actuate said microswitch and a blade 197 fixed to a cam shaft 196 supporting said cam. When the feeding of web W is stopped and the web W is held in the above-noted stretched condition between the knife 181 and the roller 161 as shown in FIG. 9 the web comes in contact with the blade 197, causing the blade 197, cam shaft 196 and cam 195 to turn counterclockwise. The switch 194 is thereby actuated.

Upon completion of wrapping, the gear 168 and therefore the arm 164 are moved away from the coin stack under the action of the cam surface 172a through the lever 174, link 177, sector gear 171, gear 169 and arm 164, and the levers 77 and 83 are moved away from each other by the action of the cams 139 and 140. The coin stack is thus allowed to drop downwardly.

Operation

When the main switch (not shown) is operated, all motors are set in motion and the disc 1 in the coin selecting section starts its rotation. Coins are then placed on the disc, whereupon only those coins whose diameters are smaller than a predetermined value are allowed to proceed into the coin selection groove 2. In the coin selection groove 2, the coins having a diameter smaller than the predetermined value drop downwardly, and only coins having the predetermined diameter, i.e., the coins of a desired type are discharged by the discharge wheel 3. During travelling of the coins, each coin fits in a peripheral notch 14a of the star wheel 14 to cause said star wheel to rotate. The rotational movement of the star wheel 14 is recorded by the counter 6 by way of the shaft 17.

The coins having been discharged by the discharge wheel 3 are stacked in the coin stacking cylinder assembly 51 after passing through the coin passage D. Upon detecting a predetermined number of coins having been discharged by the discharge wheel, the counter 6 emits a signal, whereby the rotation of the discharge wheel 3 is stopped and simultaneously the turning force of the motor 119 is transmitted to the cam shaft 126. Thus, the coin wrapping section is set in operation in the manner described previously.

If the number of coins stacked in the coin stacking cylinder assembly 51 is smaller than a predetermined number, the lever 77 moves downwardly to a point lower than the normal gripping position. This actuates the switch 75. The motor 199 is, as a result, reversed in its rotation, causing the wrapping mechanism to return to its initial position and at the same time the solenoid 115 is excited retracting the bottom plate 11 and thereby causing the coins in the coin stacking cylinder assembly 51 to be discharged downwardly.

In addition, if the wrapping web is not supplied as required or is jammed during its travel, the switch 194 is rendered inoperative, with the result that the driving motor for the disc 1 in the coin selecting mechanism is stopped, interrupting the operation of the entire machine.

Figure 10:
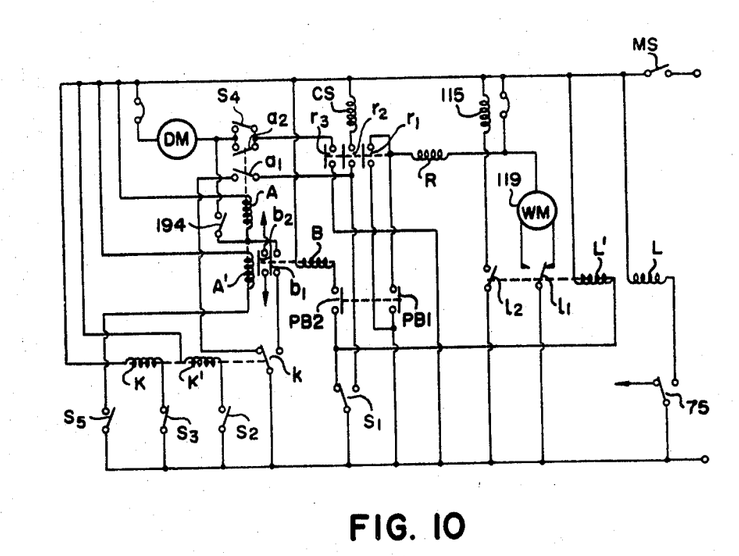
FIGURE 10 is a wiring diagram of an electric control circuit.

An electric circuit for controlling the operation of the above apparatus is shown in FIG. 10, wherein the disposition of the contact for each switch is shown for the starting condition. When a main switch MS is closed, a solenoid L' is excited. The relay, which consists of solenoids L and L' and contacts $1_1$ and $1_2$, is of the bi-stable type, and the contacts $1_1$ and $1_2$ are in the positions shown when the solenoid L' is excited, whereas the contact $1_1$ moves to the opposite side and the contact $1_2$ is closed when the solenoid L is excited. The motor 119 for the wrapping operation rotates in normal direction when solenoid L is excited.

Next, a press button switch is depressed, whereupon contacts $PB_1$ and $PB_2$ are closed, with the switch $PB_1$ closing a circuit to excite a solenoid R so that relay contacts $r_1$, $r_2$ and $r_3$ are closed. The contract $r_1$ constitutes a self-holding circuit for the relay, so that the solenoid R is maintained excited even after the contact $PB_1$ is opened upon removing the pressure from the press button switch.

Since the switch $PB_2$ is closed simultaneously, a solenoid B of another relay is simultaneously excited closing the contacts $b_1$ and $b_2$ of the relay. The contact $b_2$ is disposed in a counting start circuit (not shown) and, when the contact $b_2$ is closed, counting of the coins is commenced and a switch $S_2$ is closed by mechanical means, while a switch $S_3$ is opened also by mechanical means. As a result, a solenoid K' is excited and a solenoid K is demagnetized. The relay consisting of the solenoids K and K', and a contact $k$, is of the bi-stable type. The contact $k$ is placed on the position shown when the solenoid K is excited and is moved to the opposite side when the solenoid K' is excited.

It will be seen that an exciting circuit comprising a solenoid A and the relay contacts $b_1$ and $k$ is formed instantaneously and concurrently with the closure of the switch $PB_2$ upon a depressing of the press button and commencement of the counting.

The relay consisting of solenoids A and A', and switches $a_1$ and $a_2$, is also of the bi-stable type, so that the switches $a_1$ and $a_2$ are closed simultaneously upon excitation of the solenoid A and are maintained in closed position even after the solenoid is demagnetized, whereas the switches $a_1$ and $a_2$ are opened simultaneously when the solenoid A' is excited and are maintained in their open positions even after said solenoid is demagnetized. Therefore, upon excitation of the solenoid A, as described above, the switches $a_1$ and $a_2$ are instantaneously closed. When the switches $a_2$ is closed, a motor DM for driving the disc 1 is actuated.

When the counting mechanism has counted a predetermined number of coins, a counting completion switch $S_3$ is closed and a switch $S_2$ is opened, and thus the relay switch $k$ is returned to its initial position as shown in FIG. 10. A clutch solenoid $cs$ is thus excited to actuate the clutch between the pulley 123 and the shaft 124, whereby the rotation of the motor 119 is transmitted to the cam shaft 126, setting the wrapping mechanism in operation.

After the wrapping mechanism has removed the coin stack from the cylinder assembly 51, the counting mechanism starts counting again, so that the switch $S_2$ is closed and the switch $S_3$ is opened, and thus the relay switch $k$ is moved to a side opposite that shown. In this case, however, since the cam switch $S_1$ is switched in a direction opposite to that shown in the figure under the action of the cam on the cam shaft 126, immediately after said cam shaft starts to rotate, the solenoid $cs$ is continuously held in the excited state. As the cam shaft 126 returns to its original position upon making one complete turn, the switch $S_1$ is returned to the position shown and the clutch solenoid $cs$ is thus demagnetized. Thereafter, when the counting mechanism has completed counting, the switch $S_2$ is opened and the switch $S_3$ is closed, causing the relay switch $k$ to return to the position shown and the clutch solenoid $cs$ is excited again.

When the cam shaft 126 turns through a suitable angle, a switch $S_4$ which is adapted to be actuated by the cam on said cam shaft is closed and, subsequently, another switch $S_5$ which is adapted to be actuated by another cam on said cam shaft 126 is closed. Thus, the solenoid A' is excited and the switches $a_1$ and $a_2$ are opened. The motor DM continues its rotation because the switch $S_4$ is closed.

When the web W is taken up by the wrapping rollers during wrapping operation, the web is held tense between the knife 181 and the roller 161, bringing the switch 194 into the closed position. The solenoid A is excited instantaneously by way of the switches 194, $S_4$ and $r_3$, and thus the switches $a_1$ and $a_2$ are closed.

Although the switch $S_4$ is opened before the cam shaft 126 returns to its starting position in making one full turn, the motor DM continues it rotation because the switch $a_2$ is held in a closed position.

When the wrapping web W is not fed in a regular manner, the switch 194 assumes an open position and the switches $a_1$ and $a_2$ are maintained in their open positions. Thus the rotation of the motor DM is stopped when the cam switch $S_4$ is opened. When this occurs, the wrapping paper W is rearranged in prescribed position and the press button switches $PB_1$ and $PB_2$ are closed, whereupon the machine starts its operation again.

Where the number of coins in the coin stacking cylinder assembly 51 is short, the switch 75 operates in the manner described previously thereby exciting the solenoid L. In this case, the exciting circuit for the solenoid L' is broken so that the switch $1_1$ is switched to the reversing circuit for the motor 119. Upon reversing of the motor 119, the wrapping mechanism is returned to its starting position and the switch $1_2$ is closed to excite the solenoid 115. The bottom plate 111 is, therefore, retracted causing the coins in the coin stacking cylinder assembly 51 to be discharged downwardly.

When the wrapping mechanism has returned to its starting position, the cam switch $S_1$ is placed in the position shown in FIG. 10, placing the clutch solenoid $cs$ in the demagnetized position, and thus the wrapping mechanism is maintained at the starting position. At the same time, the solenoid L' is excited causing the switches $1_1$ and $1_2$ to return to their initial positions, and the motor WM starts to rotate in the normal direction. Upon closing the press button switches $PB_1$ and $PB_2$ under this state, the machine commences the normal operation again.

As may be understood from the foregoing description, it is possible according to the present invention to detect automatically the irregularities in the machine operation and thereby to retain all mechanisms in the respective positions suitable for resuming the operation. This enables the machine to be operated automatically at high efficiency.

Although the present invention has been described and illustrated herein in terms of the specific embodiment, many changes and modifications are possible in respect of detail construction and arrangement without deviating from the spirit or scope of the invention.

What is claimed is:

1. Coin handling apparatus having a normal flow of coins therethrough and comprising coin selection means, coin counting means for counting selected coins, coin stacking means for receiving and stacking selected and counted coins, stack measuring means for measuring stacked coins, coin wrapping means for wrapping stacks of coins, coin transport means for moving stacks of coins from said stacking means to said wrapping means, a source of power coupled to respective of said means, and monitoring means responsive to an irregularity with respect to the operation of at least one of the first said means to alter said flow of coins.

2. Apparatus as claimed in claim 1 comprising a coin supply means feeding said selection means and wherein said coin wrapping means includes a supply of wrapping material in the form of a web and said monitoring means includes means to detect an irregularity in the supply of the web and thereupon to terminate the supply of coins by said coin supply means to said selection means.

3. Apparatus as claimed in claim 1, wherein the coin stacking means includes discharge means controlling the discharge of coins therefrom and said monitoring means includes means to detect a shortage of coins in the stacking means to control the discharge means to discharge coins accumulated in said stacking means.

4. Apparatus as claimed in claim 1 comprising coupling means coupling said source of power to said transport means and a coin supply means feeding coins to said selection means, said counting means including means to generate an electrical signal upon the counting of a predetermined number of coins, said coin supply means being responsive to said signal to terminate the supply of coins to said selection means, said apparatus further including detection means active upon the generation of said signal to detect a shortage of coins in said stacking means to interrupt the operation of said transport means.

5. Apparatus as claimed in claim 4 comprising discharge means controlled by said detection means for discharging coins from said stacking apparatus.

6. Apparatus as claimed in claim 1, wherein said monitoring means includes an electric switch, a lever resting against said web and means responsive to said lever for actuating said switch.

7. Apparatus as claimed in claim 1 comprising coin supply means for feeding coins to said selection means, a second source of power coupled to said supply means to operate the same, a control switch, and electric circuit means operated by said switch to actuate said sources of power and being responsive to said monitoring means to selectively deactivate said sources of power.

8. Apparatus as claimed in claim 7, wherein said electric circuit means includes a plurality of solenoid means and switch means interrelated to control said sources of power and said transport and wrapping means, said apparatus including cam control means driven by at least one of said sources to control the latter said switch means and thereby said solenoid means, said monitoring means including further switch means coupled in operative association with the first said switch means and the solenoid means to further control the operation of the latter.

9. Apparatus as claimed in claim 8, wherein one of said solenoid means controls the source of power driving said wrapping and transport means and is a bi-stable relay including two solenoids for respectively actuating and deactivating said source, said further switch means including a switch actuated upon the sensing of a shortage of coins in said stacking means, one of said solenoids being controlled by the latter said switch.

10. Apparatus as claimed in claim 9, wherein another of said solenoid means controls the other of said sources and is a bi-stable relay including two solenoids, said manitoring means including means sensitive to the operation of said wrapping means to control one of the latter said solenoids, the source of power driving the wrapping and transport means including cam control means which controls one of the first said switch means to control the other of the latter said solenoids.

11. Apparatus as claimed in claim 10, wherein a third of said solenoid means includes a relay additionally controlling the second said solenoid means, said control switch being a manual control for the third solenoid means, one of the first said switch means being coupled to and also controlling said third solenoid means, the source of power driving the wrapping and transport means including cam control means which controls the switch means controlling the third solenoid means.

12. Apparatus as claimed in claim 11 further comprising a clutch coupling means between the source of power driving the wrapping and transport means and said wrapping and transport means and connected to a fourth of said solenoid means whereby the operation of said wrapping and transport means is controlled.

13. Apparatus as claimed in claim 11 comprising another solenoid means coupled to and controlling the second said solenoid means and being a bi-stable relay including two solenoids at least one of which is coupled to and controlling by said coin counting means.

14. Apparatus as claimed in claim 1, wherein said transport means includes a pair of pivotable arms pivotable to a position straddling a stack of coins in said stacking means and means for moving said arms towards and away from each other for the endwise grasping of stacks of coins, said monitoring means including a switch operated by one of said arms when a stack is below anticipated size.

15. Apparatus as claimed in claim 5, wherein said discharge means includes a plate positioned beneath said stacking means and adapted for being withdrawn from beneath the stacking means to permit the discharge of coins from the latter.

References Cited
UNITED STATES PATENTS

| | | | |
|---|---|---|---|
| 751,246 | 2/1904 | Batdorf | 53—62 |
| 3,416,291 | 12/1968 | Uchida | 53—78 |

TRAVIS S. McGEHEE, Primary Examiner

U.S. Cl. X.R.

53—62, 78